United States Patent
Quinn et al.

(10) Patent No.: US 9,253,274 B2
(45) Date of Patent: Feb. 2, 2016

(54) SERVICE INSERTION ARCHITECTURE

(75) Inventors: Paul Quinn, San Francisco, CA (US); Kenneth Durazzo, San Ramon, CA (US); Andrew G. Harvey, Pleasanton, CA (US); Satish Gannu, San Jose, CA (US); Dean Cheng, Fremont, CA (US); Frederick Baker, Santa Barbara, CA (US); Richard M. Pruss, Tewantin (AU); Barry R. Greene, Cupertino, CA (US); Saravanakumar Rajendran, San Jose, CA (US); Robert Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 1614 days.

(21) Appl. No.: 11/655,363

(22) Filed: Jan. 19, 2007

(65) Prior Publication Data

US 2008/0177896 A1 Jul. 24, 2008

(51) Int. Cl.
*G06F 15/173* (2006.01)
*H04L 29/08* (2006.01)
*G06F 9/50* (2006.01)

(52) U.S. Cl.
CPC .......... *H04L 67/2814* (2013.01); *G06F 9/5055* (2013.01); *H04L 67/2838* (2013.01); *H04L 67/327* (2013.01)

(58) Field of Classification Search
CPC ............ H04L 67/2814; H04L 67/2838; H04L 67/327
USPC .......................................................... 709/226
See application file for complete search history.

(56) References Cited

U.S. PATENT DOCUMENTS

| | | | |
|---|---|---|---|
| 6,888,828 B1 * | 5/2005 | Partanen et al. | 370/389 |
| 7,095,715 B2 | 8/2006 | Buckman et al. | |
| 7,443,796 B1 * | 10/2008 | Albert et al. | 370/235 |
| 7,486,622 B2 * | 2/2009 | Regan et al. | 370/236 |
| 2002/0156893 A1 | 10/2002 | Pouyoul et al. | |
| 2002/0167935 A1 * | 11/2002 | Nabkel et al. | 370/352 |
| 2003/0110081 A1 | 6/2003 | Tosaki et al. | |
| 2003/0226142 A1 | 12/2003 | Rand | |
| 2005/0044197 A1 | 2/2005 | Lai | |
| 2006/0045024 A1 * | 3/2006 | Previdi et al. | 370/254 |

(Continued)

OTHER PUBLICATIONS

Singh, Sumeet et al. Service Portability: Why HTTP redirect is the model for the future [online], Nov. 2006 [retrieved on Sep. 8, 2009]. Retrieved from the Internet :<URL: http://conferences.sigcomm.org/hotnets/2006/singh06service.pdf>.*

(Continued)

*Primary Examiner* — June Sison
*Assistant Examiner* — Adam Cooney
(74) *Attorney, Agent, or Firm* — Parker Ibrahim & Berg LLC; James M. Behmke; Stephen D. LeBarron (57) ABSTRACT

In one embodiment, an apparatus can include a service broker configured to: (i) register a service classifier, and to provide context information to the service classifier; and (ii) register a plurality of service nodes. The service broker can also receive capability and service requests from the service classifier. Further, the context information can include a service header, a reachability indication, and an encapsulation, where the service header and the encapsulation may be attached or related to a packet in the service classifier. In addition, the service classifier can use this information to redirect the packet to a first service node.

12 Claims, 5 Drawing Sheets

(56) References Cited

U.S. PATENT DOCUMENTS

| | | | |
|---|---|---|---|
| 2006/0074502 A1 | 4/2006 | McFarland | |
| 2006/0112400 A1* | 5/2006 | Zhang et al. | 719/328 |
| 2008/0080509 A1* | 4/2008 | Khanna et al. | 370/392 |
| 2008/0080517 A1* | 4/2008 | Roy et al. | 370/395.5 |

OTHER PUBLICATIONS

Sumeet Singh, et al.; "Service Portability" Record of the 5th Workshop on Hot Topics, Hot Nets V, Irvine, CA, Nov. 29-30, 2006; obtained from http://www.read.cs.ucla.edu/hotnets5/program.pdf; pp. 49-54.

Ladner, Roy, et al.; "Case-Based Classification Alternatives to Ontologies for Automated Web Service Discovery and Integration" proceedings of the SPIE—The International Society for Optical Engineering; Apr. 17, 2006; 8 pages.

Lemmens, Rob, et al.; "Semantic and Syntactic Service Descriptions at Work in Geo-service Chaining" 9th Agile International Conference on Geographic Information Science; Apr. 20, 2006; 11 pages.

Kiehle, Christian, et al.; "Standardized Geoprocessing—Taking Spatial Data Infrastructures One Step Further" 9th Agile International Conference on Geographic Information Science, Apr. 22, 2006; 10 pages.

\* cited by examiner

SERVICE INSERTION ARCHITECTURE

TECHNICAL FIELD

The present disclosure relates generally to the insertion of services into a network.

BACKGROUND

In modern Internet Protocol (IP) networks, there may be no consistent or uniform way to add "high-touch" services, or other services or features, to the network. Each unique service is typically added in a service-specific manner. Due to complexities in deployment and management, potential services may be foregone because of a lack of a consistent, inter-service architecture. As a result, such systems can suffer: (i) higher deployment costs; (ii) lower network availability; (iii) modified network topology; (iv) additional complexity in network operations and management; and/or (v) inability to use certain services in enterprise, commercial, or service provider networks.

Conventional approaches can include adding features to a forwarding path, providing hardware alterations (e.g., adjusting cable connections, or adding external devices), or performing other static configuration changes, software traces, and/or internal routing to add services to a network. However, such conventional approaches typically differ for different services, and thus may not provide a consistent, inter-service architecture for adding services to a network.

DESCRIPTION OF EXAMPLE EMBODIMENTS

Overview

In one embodiment, an apparatus can include a service broker configured to: (i) register a service classifier, and to provide context information to the service classifier; and (ii) register a plurality of service nodes. The service broker can also receive capability and service requests from the service classifier. Further, the context information can include a service header, a reachability indication, and an encapsulation, where the service header and the encapsulation may be attached or related to a packet in the service classifier. Also, the service classifier can use this information to redirect the packet to a first service node, or to any combination of service nodes.

In one embodiment, a method can include: (i) registering a service classifier with a service broker; (ii) providing context information from the service broker to the service classifier; and (iii) registering a plurality of service nodes with the service broker.

In one embodiment, a system can include: (i) a service broker configured to provide context information to a service classifier in response to a registration of the service classifier, where the service classifier can provide a redirected packet using the context information; and (ii) a plurality of service nodes configured to register with the service broker, and to allow traverse of the redirected packet in a service chaining order.

Example Embodiments

In particular embodiments, an insertion of services into a network and/or insertion of a set of discrete services that can run collaboratively within a forwarding or switching path of a network device, can be accommodated. Further, a "service" can include any layer 3 through layer 7 application that may reside on top of layer 2 switching and/or layer 3 routing services, for example. In particular embodiments, a "service" can be an optional function that may be performed within a network that provides value to a manager or user of the network. Examples of such services can include encryption, decryption, specialized routing, intrusion management, accounting, and other such functions. Generally, a service can provide a way to add service features that can manipulate packets above and beyond mere packet forwarding. Also, "networks" can include internal device networks, as well as classical external device networks.

In particular embodiments, components can operate together to form an architecture and/or system, such as: (i) registration; (ii) redirection; and (iii) service context. For registration, services can register with one or more "service brokers" that can provide a consistent domain-wide service view. For redirection, packets can be redirected to an appropriate service node in the network, independent of physical location. Incoming data packets can then be "routed" and/or "switched" based on the service context. For service context, post classification, extra information can be conveyed in various ways (e.g., extra packet information, memory space, etc.), and interpreted by one or more participating service nodes. This extra information can include service chaining information, information about a user, flow state, etc.

In addition to complimenting existing service delivery, particular service insertion architecture embodiments can provide a foundation for new service delivery models and functionally due to four attributes of the architecture: (i) network topological independence, where services can reside anywhere in the network, irrespective of network path or network node deployment; (ii) inter-service communication, which can provide a state sharing mechanism that can be used to chain services together and to share information among the services; (iii) service topology independence, in which the actual form of the service may no longer matter (e.g., distributed, decentralized, or a combination thereof, and used as appropriate); and (iv) consistent administration and management policies.

The combination of these attributes can allow for new service options, such as intelligent service routing, end-to-end shared policy, and the sharing of important classification information amongst discrete services. In addition, particular embodiments can facilitate the convergence of common services (e.g., redundancy elimination), thereby allowing each service to devote more of its hardware footprint to core services. Also, instrumentation and diagnosis of common activities associated with a given service chaining can be simplified.

In particular embodiments, a service insertion architecture can include: (i) architectural components that can participate in control and data planes for service delivery; (ii) service context for state sharing and service chaining; and (iii) redirection of data or service packets to the appropriate service node or nodes. Further, such a service insertion architecture can include four major node "types" or "roles": (i) a service classifier that can perform initial classification and service header insertion; (ii) a service directory that can maintain directory and policy information; (iii) a service broker that may be responsible for inter-component data exchanges and service topology state; and (iv) a service node that can deliver one or more actual services and/or features.

Although each role may be considered distinct, a single device may implement any number of these components within a network. For example, a router might simply consume services and therefore be a service classifier. Alternatively, if that router is configured to offer services, the router might act as a service classifier, service directory, service broker and service node simultaneously, for example. In addition, regardless of physical location and/or deployment, the component definition may not change and associated roles and responsibilities may remain intact from an architectural perspective.

An architecture and/or system in particular embodiments can include devices and/or processes having specified roles and operating as a system for delivering services. Such services, which may include any feature or appropriate service, can be delivered in a consistent manner where all services can be inserted in essentially the same way. In addition, an architecture and/or system in particular embodiments can be scalable and extensible because any service can be added, moved, or removed as may be necessary. Further, services can be placed in the network as may be appropriate for a given network since packets can be routed based on the context information, and any type of network can be utilized in particular embodiments. This can allow for network operators to share services among network edge devices and, in many cases, to create service viability. Further, since the redirected packets "go to" the services, topology need not be changed and network availability can be largely unaffected.

In particular embodiments, a service insertion architecture and/or system can provide a platform-independent, consistent architecture for adding high-touch services, or other services or features, to a network without requiring topology changes or major software upgrades in the associated network. Further, within a particular service insertion architecture service, context can be exchanged, thus enabling service information to affect a packet path and an order of processing (i.e., a service chain). Such a service insertion architecture can be incorporated in routers, switches, service engines, and/or embedded blades and appliances, for example. In addition, any network equipment vendor or service provider could use particular embodiments to provide a consistent model for adding networking services.

Figure 1:
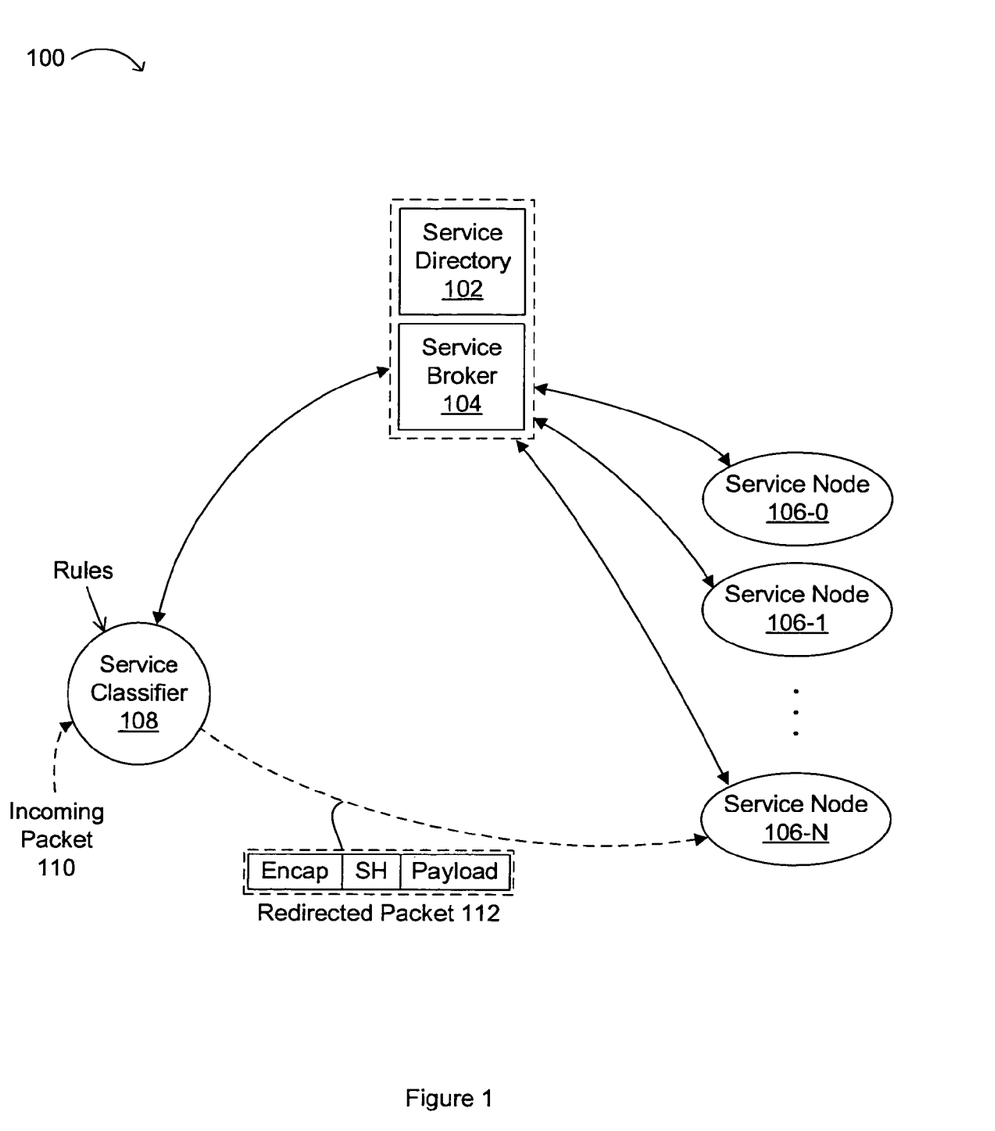
FIG. 1 illustrates an example service insertion architecture.

Referring now to FIG. 1, an example service insertion architecture is indicated by the general reference character 100. Service directory 102 can be a relatively static store for infrequently changing information, such as policy definition and/or service mapping. For example, a policy definition can include a service name (e.g., "red" or "userservices"), and service feature type (e.g., intrusion prevention system (IPS), firewall), and this can be communicated to service broker 104. Service directory 102 can also act as a policy point for distribution (as opposed to definition) for a previously established policy. Service directory 102 can also act as a policy communication point (e.g., working in conjunction with other policy stores).

In a service insertion architecture, service broker 104, or other service directories, may be the only nodes that communicate directly with service directory 102. Further, a service directory can: (i) accept, via a policy plane, service chaining or predetermined ordering, and chain to service node (e.g., service nodes 106-0, 106-1, . . . 106-N) mapping configuration; (ii) act as store/interface for service insertion architecture policy information; (iii) be replicated for scaling; and/or (iv) communicate, via programmatic interfaces, with other policy points.

Service broker 104 can handle communication and control plane traffic from/to service nodes 106-0, 106-1, . . . 106-N, and service classifier 108. The service nodes can contact service broker 104 to register services and receive, from service broker 104, information about domain-wide services and service context (e.g., header) to service mapping. When service classifier 108 requests services, service broker 104 can return an appropriate "best match" service context, as well as service location (e.g., next hop) or "reachability" information. In addition, such communication and control plane allocation can be performed via a control plane. Further, a first service node (e.g., service node 106-N) can also operate as a service broker for other participating service nodes in particular embodiments.

In particular embodiments, service brokers can perform the following: (i) authenticate and authorize service classifiers and service nodes; (ii) exchange service registration information with service nodes, including withdrawal of a service; (iii) communicate service context to service node mapping information to service nodes; (iv) return service information in response to a request from a service classifier (e.g., get a namespace-based request and return header and other pertinent information); (v) present consistent view of a state of service topology for management purposes; and/or (vi) be included in a hierarchy of service brokers. Service broker 104 may also be "anycasted" for redundancy and load distribution.

A service node (e.g., service nodes 106-0, 106-1, . . . 106-N) can include a router, appliance, a switch filled with blades, a blade, a software process, or any distinguishable entity that can deliver or execute any appropriate service or feature. A service node can perform one or more service fragments and may participate in both the control plane and the data plane. Post authentication and authorization, a service node can register its capabilities with a service broker. Additionally, service nodes can receive from service broker 104, when required, service context, data plane information (e.g., one or more encapsulation types) and/or a next-hop location or reachability indication for the next service feature in the chain. In certain circumstances, a service node can also modify service headers as may be needed.

In particular embodiments, one or more of service nodes 106-0, 106-1, . . . 106-N, can: (i) perform service features (e.g., firewall); (ii) register and send capabilities with service broker 104; (iii) send service information to service broker 104; (iv) receive service context to next-hop mapping if required; (v) receive data forwarding specifics (e.g., encapsulation type) from service broker 104; and/or (vi) participate in the data plane with service classifier 108.

Service classifier 108 can be a first entry point for a packet (e.g., incoming packet 110) in particular service insertion architecture embodiments, and thus may be an "edge" of a service domain. Service classifier 108 can also participate in the control plane with service broker 104, and in the data plane with service nodes 106-0, 106-1, . . . 106-N. In particular embodiments, service classifier 108 can operate as an edge, and can perform: (i) authentication and authorization to/from service broker 104; (ii) initial policy choice based on classification and associated namespace; (iii) communication with service broker 104 to send namespace and receive appropriate service or context information (e.g., service header); (iv) service header insertion onto data plane packets; (v) data plane packet encapsulation for network delivery; and/or (vi) forward data packets for servicing.

In particular embodiments, service classifier 108 can classify data and determine if services are needed, and what services incoming packet 110 may need to traverse. Such a service can be made up of many service features (e.g., a firewall, and an IDS, forming two service "features"). Service classifier 108 may be a self-contained router, or multiple such routers or other devices.

In FIG. 1, an example operational flow can include a service node registering, or exchange of capabilities over the control plane. To register the service nodes, each of service nodes 106-0, 106-1, . . . 106-N, can indicate to service broker 104 that the service node represents a service feature or features having certain capabilities. For example, service node 106-1 may indicate that it is a firewall, supports certain types of exchanges, and is deployed in a designated location. Service classifier 108 can also register by providing capabilities, and by requesting services by name (e.g., "cable companies who pay me $5"), and service broker 104 can return service information.

As shown, service classifier 108 can be provisioned with rules, and as a result of such rules, service classifier 108 can make a service request (e.g., all traffic from User A that goes to User B matches rule X, and request appropriate services). Thus, service classifier 108 may make requests as a result of the classification rule whereby services can be requested based on the classification.

Service broker 104 can return service information to service classifier 108, including a service context (e.g., using existing bits within the header, or creating a new header or using memory space), reachability (or next-hop information in an IP application), and encapsulation. Once such service information has arrived in service classifier 108, actual data packets (e.g., incoming packet 110) may be received. The packets can then be redirected (e.g., redirected packet 112) with an encapsulation, a service header (SH), and payload, and the redirected packet can then be sent to a first service node in a service chain or predetermined ordered list of services/nodes. In the particular example shown in FIG. 1, service node 106-N may be first in such a chain for redirected packet 112, followed by another of the service nodes, and so on until all designated service nodes have been traversed.

As discussed above, in particular embodiments, a service insertion architecture can add context to packets, insert context specific packets into a flow, or create a pointer to some type of context "heap" (e.g., a data resident in a service broker, or a separate data store). One form of context can include a service header to convey information about a redirected packet (e.g., 112). For example, service chain information for a packet may be carried in the service header, where this information can allow services to know a required service path for a given packet. Further, service chain information need not be static, but rather services can modify such chain information to alter the path taken by a packet. Alternatively, context may be non-header packet context, such as may include context stored in memory that is pointed to for processing, for example.

In particular embodiments, a service insertion architecture service header can provide information about flow classification, as populated by a service classifier (e.g., 108) and/or prior service nodes (e.g., 106-0, 106-1, . . . 106-N). Such classification information can be used to avoid duplicate classification or to provide classification information to a node that could not perform requisite classification. Examples include subscriber/user identifiers, ingress interface information, quality of service information, etc. As with service chaining information, service nodes can update packet information in particular embodiments. In addition, a service header can incorporate status information to report a path of a packet through services, and/or to provide other administrative or diagnostic information.

As discussed above, redirection can send a packet from an ingress service classifier (e.g., 108) to a first service node (e.g., 106-N) via the data plane, regardless of the physical location of any service node. Both the original packet (e.g., incoming packet 110) and an associated service context may be redirected to a particular service node for service processing. This service node can then perform a service and, if needed, may redirect the packets to a next service node in the predetermined order or path of the service chain. Such a predetermined order or path may be indicated in the service context, for example.

In particular embodiments, a service insertion architecture and/or system may enforce no proximity requirement such that a packet can be redirected to intra-device resources (e.g., an in-chassis blade), to directly connected external devices, or across a network. Thus, the service path can be composed of any combination of service locations. Regardless of a redirection destination, an original IP packet, or data within an Ethernet frame, and associated service header may be encapsulated in a new appropriate data plane header for delivery. Once an outer transport header is applied, such packets can be forwarded using existing data plane models.

Figure 2:
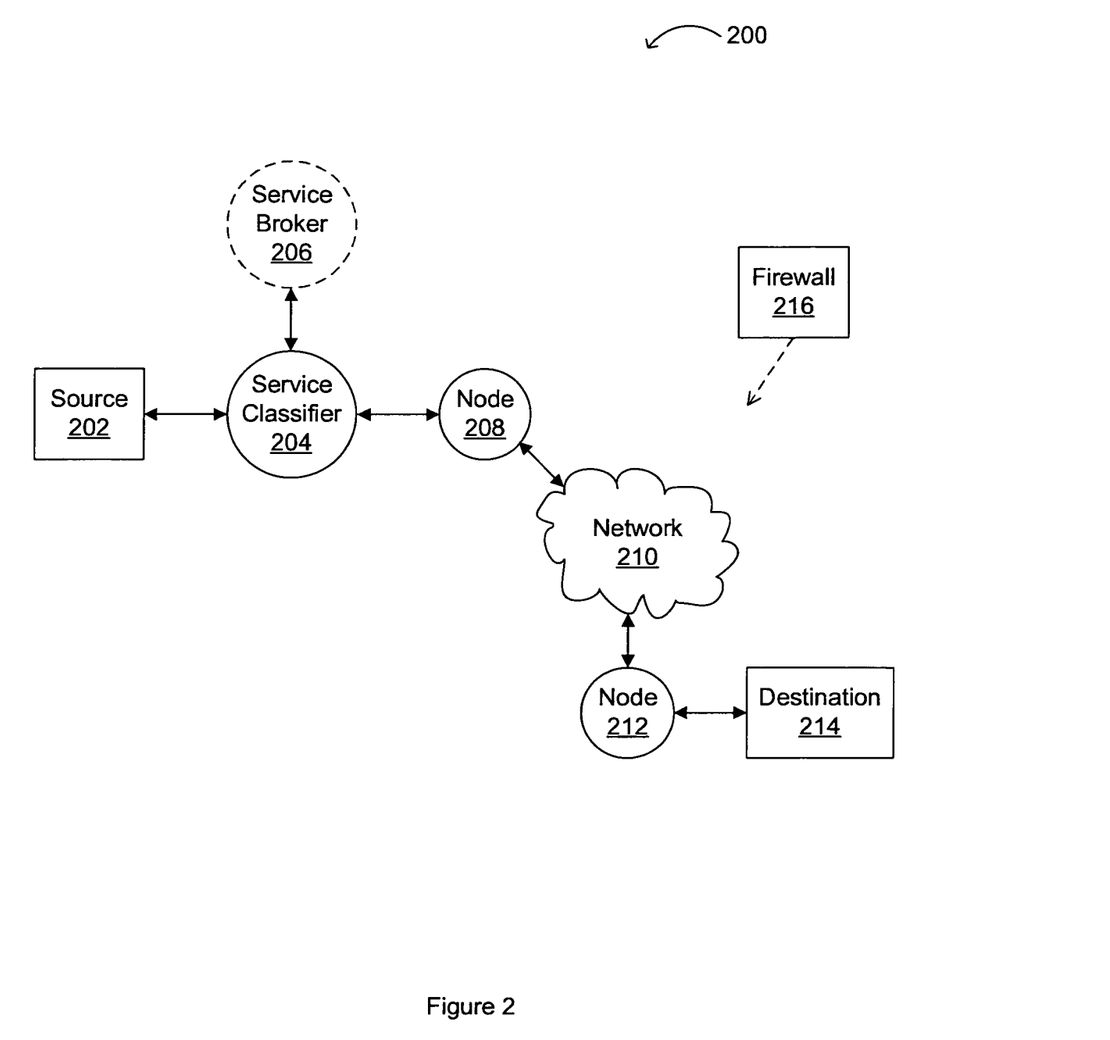
FIG. 2 illustrates an example system configured to operate as a service insertion architecture.

Referring now to FIG. 2, an example system configured to operate as a service insertion architecture is indicated by the general reference character 200. In particular embodiments, a service insertion architecture may be a software feature and/or function that can be implemented on all participating devices in a network. Further, nodes or devices in a network might perform more than one service insertion architecture role. For example, a service classifier may accept return traffic from a last service node in a service chain, essentially making the service classifier the last hop in the chain. Alternatively, a service node may perform additional classification, thus making that particular service node act as a service node as well as a secondary classifier, for example.

FIG. 2 may represent a relatively simple network structure including nodes 208 and 212 and network 210 (e.g., a virtual private network (VPN), or a public network, such as the Internet). In this particular example, firewall 216 can represent a service to be inserted, and source 202 and destination 214 can indicate an ingress and an egress, respectively, for a packet path. One node can be configured as service classifier 204, and another may be classified as service broker 206, for example. However, in some applications, service broker 206 may not be required. Further intermediate nodes (e.g., 208, 212, and others in network 210) may not need to participate in the service insertion architecture itself. Rather, other nodes may need to participate in the architecture, such as a node configured so as to become service classifier 204, as discussed.

In particular embodiments, a service insertion architecture can be a software component that runs on top of all participating nodes or devices in a system. Accordingly, information available on an existing data plane can be utilized for mapping a virtual service control plane or architecture onto the data plane or packet information. Thus, in particular embodiments, a service can be inserted into the control plane, and a logical or topological modification to get the service into the data path may not be necessary. Instead, the service can be virtually inserted into the data path, instead of having to manually reconfigure all routers in a system, as in some convention approaches. In particular embodiments, such software may be "built in" or otherwise included with device (e.g., router, firewall, etc.) operating systems such that the service is more like a feature of the device, and less like a standalone service.

In general, a high-level service insertion flow can include two logical control plane portions: (1) a service node to broker portion; and (2) a service classifier to broker portion. A service node and service broker portion flow can include: (i) service node provisioning, whereby service specifics and service insertion architecture relevant configuration may be in place; (ii) service node authentication and registering with a service broker, thereby providing information about the services offered, capabilities and location; (iii) where a service broker may now have a complete view of available services features; and (iv) sending service context information, next-hops/reachability indication, and encapsulation information (e.g., tunnel specifics) to participating service nodes in a given service chain.

A service classifier and service broker flow portion can include: (i) classification (with associated service details) provisioning on service classifiers; (ii) service classifiers requesting relevant service information (e.g., service headers), based on classification configuration, from a service broker; (iii) where ingress packets can be classified and service context may be added in the form of a service header; (iv) an outer header may also be added to the packet and its service header, where the outer header may be used to deliver the packet to the first service node in a service chain; and (v) forwarding service packets using a data plane from service node to service node.

Figure 3:
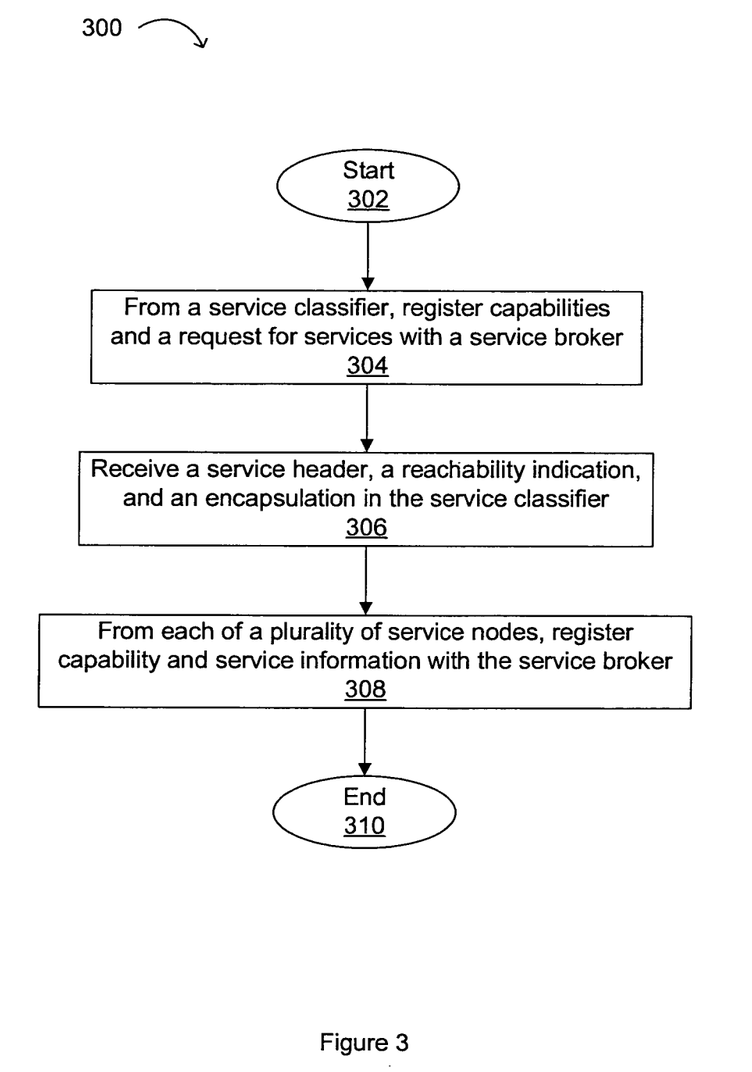
FIG. 3 illustrates an example method of registering services to a broker.

Referring now to FIG. 3, an example method of registering services to a broker is indicated by the general reference character 300. The flow can begin (302) and, from a service classifier, capabilities can be registered and a request for services can be made with a service broker (304). In the service classifier, a service header, a reachability indication, and an encapsulation can be received (306). From each of a plurality of service nodes, capability and service information can be registered with the service broker (308), and the flow can complete (310). Also in particular embodiments, the registering of capabilities and a request for services with a service broker from the service classifier (304), and registering capability and service information from the service nodes with the service broker (308) can occur substantially in parallel.

In particular embodiments, a service insertion architecture control plane may operate between service classifiers and service brokers, as well as between service brokers and service nodes. The control plane can thus be used for service registration and meeting associated redundancy requirements. The control plane may also be responsible for data plane attribute allocations to the service classifiers, for example.

As discussed above, in particular embodiments, a service insertion architecture control plane may be responsible for several applications, including: (i) service registration, where service nodes can register and exchange base capabilities with a service broker; (ii) available service feature exchange where service nodes can advertise their available features to the service broker; (iii) service chain exchanges where service chain information (e.g., service header and next-hop/reachability mappings) may be distributed by the service broker to appropriate service nodes, and service chain information may also be sent to service classifiers, in response to a request, via an American standard code for information interchange (ASCII) namespace, for services for consumption, and the service broker can return appropriate service information to the service classifiers; and (iv) load/status queries where service brokers can actively query service nodes for load information or other status information prior to allocating a service chain link to a node in order to better optimize traffic distribution.

In particular embodiments, a messaging layer of the service insertion architecture control plane may handle reliable delivery, encryption, and end-point authentication. In addition, service insertion architecture service information may be carried during the application phases once a transport session has been successfully established. Once up and running, the control plane can handle service updates, as well as withdrawals and failover, for example. Accordingly, a service insertion architecture control plane may be de-coupled from the data plane such that control plane failure may not interrupt service insertion architecture data plane packets.

As discussed above, service insertion architecture components, such as service classifiers, service brokers, service directories, and service nodes, can take any physical form on the network, including all devices being discrete elements, or being combined into one node. In particular embodiments, when the service insertion architecture control plane is used between elements (i.e., inter-node) then the base transport protocol may be transmission control protocol (TCP), for example. On the other hand, when elements are intra-node, the platform can elect to use a different appropriate intra-platform protocol, or TCP. Further, particular embodiments can also utilize the blocks extensible exchange protocol core (BEEP) above the TCP layer in order to address: (i) framing, head-of-line blocking, and other base protocol issues; and/or (ii) end-point authentication. In addition, the actual content of a service insertion architecture message may be carried via an extensible markup language (XML) and/or simple object access protocol (SOAP) message within a BEEP tunnel, for example. Also for control and data plane components, inter-process communication (IPC), or any other suitable approach, can be used as an internal transport mechanism.

As discussed above, service node registration may be used to identify service nodes to a broker, to exchange capabilities, and to register services. As such, authentication may be addressed by the control plane, and service node authentication may be handled via the policy plane. In addition, capabilities exchange can be during registration, post authentication, whereby service nodes and service brokers can share capabilities such that the service node can support the service requirements. The capabilities can include agreement on tunnel type, data plane encryption, and the like. Management and policy planes can also define a minimum set of capabilities that may be required.

In one particular example, baseline functions for service node registration can include: (i) end-point authentication; (ii) encrypted control plane communication and/or messages; (iii) versioning; (iv) control plane "keepalives"; and/or (v) notifications and error messages. Also, service node and service broker capability exchanges can include: (i) capability type; (ii) role (service node); and/or (iii) capabilities, such as tunnel type supported (e.g., multiprotocol label switching (MPLS), layer 2 tunneling protocol (L2TPv3), generic routing encapsulation (GRE)), and requested encrypted data plane.

In particular embodiments, service classifiers may also follow a similar registration process, including: (i) authentication, where service classifiers and service brokers can authenticate to each other such that only known devices can participate in a service domain; (ii) authorization, where service classifiers can be authorized to consume services (e.g., asking whether a given service classifier can actually send packets to a firewall), and this authorization may be handled by the policy plane; and/or (iii) exchanging capabilities during registration such that service classifiers can technically participate in a service chain, where all devices within a path can have an agreed upon set of capabilities, and the capabilities may also be defined by the management and policy planes, for example.

In one particular example, service classifier and service broker baseline functions can include: (i) end-point authentication; (ii) service authorization; (iii) encrypted control plane channel; (iv) versioning; and (v) control plane keepalives. Also, service classifier and service broker capability exchanges can include: (i) capability type; (ii) message length; (iii) authorization information; and/or (iv) capabilities, such as tunnel type supported (e.g., MPLS, L2TPv3, etc.), requested encrypted data plane, and determining whether packets are to be returned (e.g., in a hybrid mode). Also, a service request can include: (i) a service request type; and/or (ii) a name of a service being requested, and the service broker can return a service header, a next-hop/reachability indication, and tunnel type information, for example.

Following successful authentication and capability exchange, services nodes can inform the service broker about service details via service feature advertisements. In particular embodiments, service tables may be used to convey information about service insertion architecture services on a network. Such information can include detailed information about the services registered, such as service type and service location (e.g., service firewall A is a private internet exchange (PIX) that can be found on service node SN1), as well as other information to enable data plane setup and forwarding.

In particular embodiments, service feature tables can include: (i) service feature alias: a key used as a handle by the control plane; (ii) part number, such as for network management system (NMS) applications; (iii) user definable service description; (iv) user defined service type, so as to distinguish between multiple services, and may be defined via the management plane; (v) IP or other appropriate address to communicate with the service node, which may not be the same address used as a next-hop or reachability indication for data plane packets; (vi) location (e.g., data plane next-hop/reachability, or service location); (vii) supported data plane tunnel types; and/or (viii) cost, as an administratively defined metric for a service. In addition, such table data can be conveyed to the service broker via a service exchange message, including information such as type, message length, number of services in an update, service table details, for example.

Figure 4:
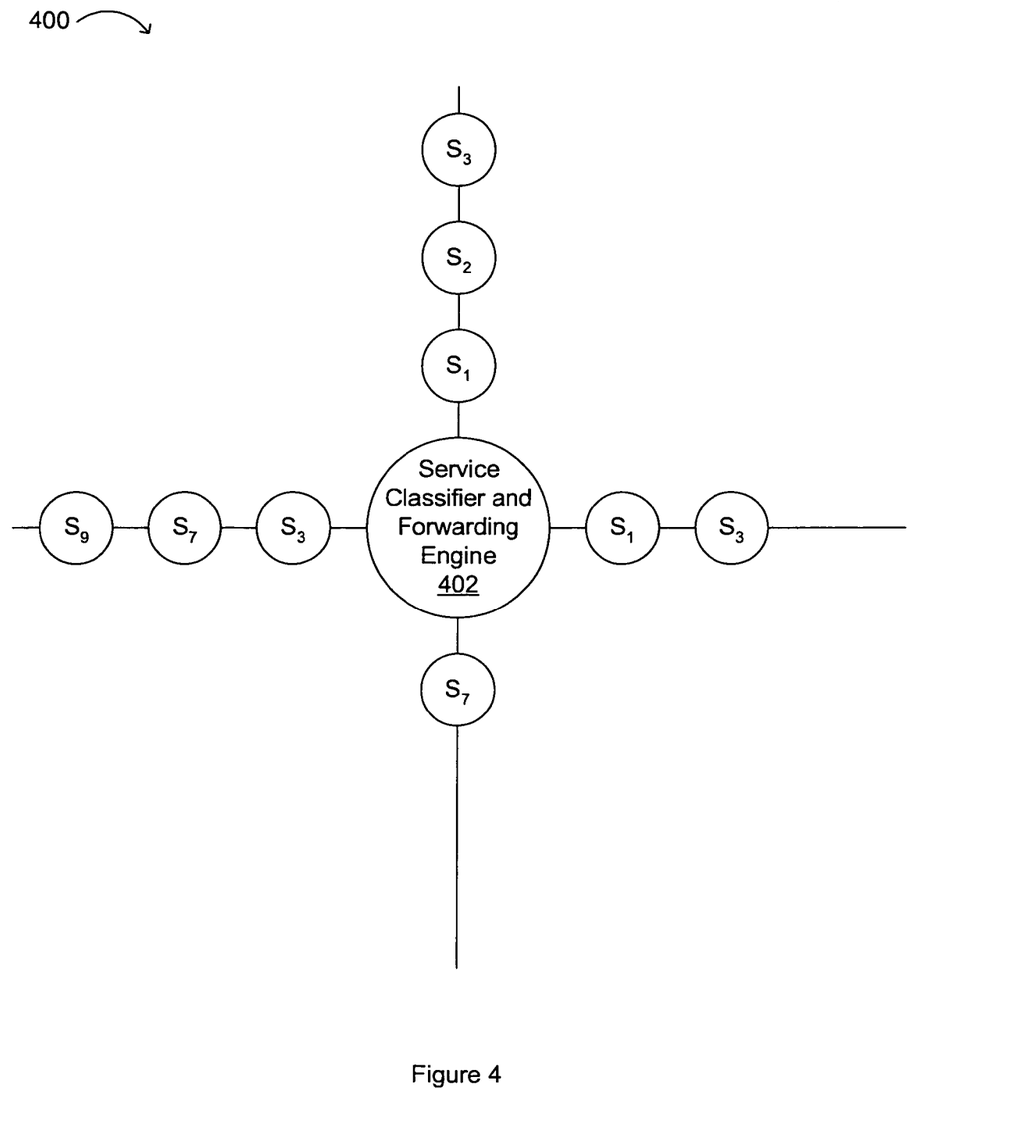
FIG. 4 illustrates an example directed service topology.

An architecture and/or system of particular embodiments can effectively create a "graph" that defines a flow of packets and state across participating services nodes. Such a graph can assume either a static chain or "directed" form, or a dynamic chain or "acyclic" form, depending on the service topology of a particular application. Referring now to FIG. 4, an example directed service topology is indicated by the general reference character 400. Service classifier and forwarding engine 402 can provide a flow of packets across service nodes. For example, service nodes $S_1$ and $S_3$ can be traversed to the right, service nodes and $S_3$, $S_7$, and $S_9$ can be traversed to the left, service node $S_7$ can be traversed to the bottom, and service nodes $S_1$, $S_2$, and $S_3$ can be traversed to the top, as shown.

Figure 5:
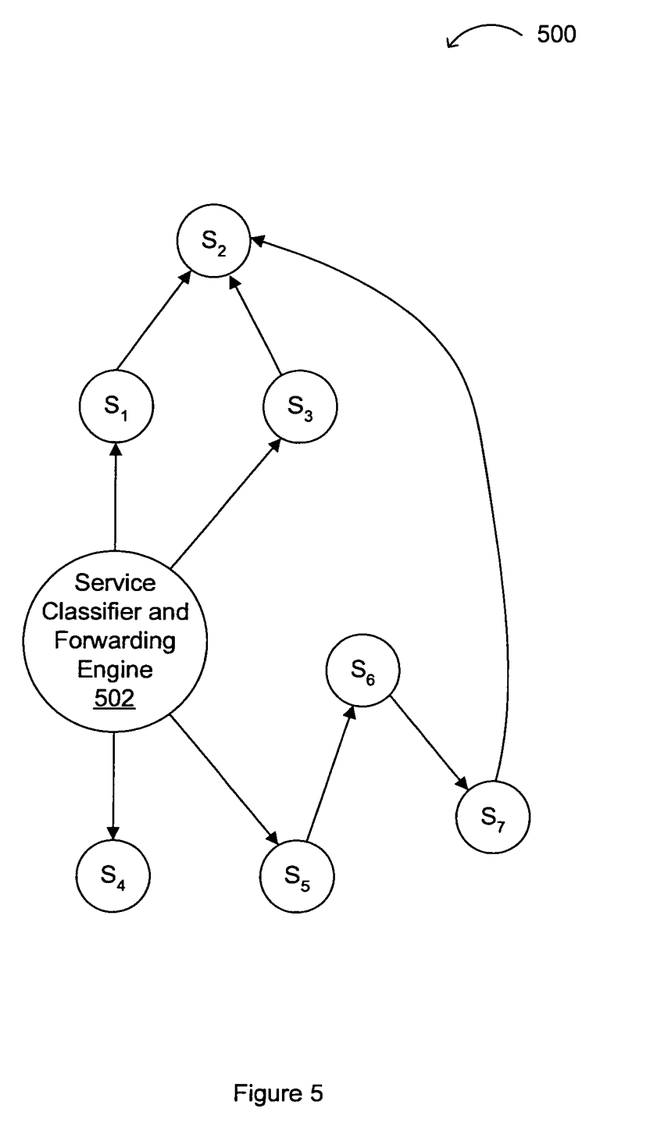
FIG. 5 illustrates an example acyclic service topology.

Referring now to FIG. 5, an example acyclic service topology is indicated by the general reference character 500. Service classifier and forwarding engine 502 can provide a flow of packets across service nodes. In this particular example, service nodes $S_1$, $S_3$, $S_4$, and $S_5$ can be traversed from service classifier and forwarding engine 502. From service node $S_5$, a traversal path can include service nodes $S_6$, $S_7$, and $S_2$. Also, service nodes $S_1$ and $S_3$ can allow traversal to service node $S_2$, as shown.

As discussed above, a service chain can be an ordered list of service features to be performed on or traversed by packet traffic. In particular embodiments, a service header can provide an encoded representation of a service chain such that elements participating in a given chain may be aware of the representative header and other chain information. Further, service chains or predetermined orders may be provisioned on a service directory via the policy plane.

For example, a policy description for a service entitled "bestservice" can include: (1) the service classifier matching traffic X for service "bestservice;" and (2) "bestservice" having three services features, across three distinct nodes, in the following order: (a) $1^{st}$ service is SN1: FW running on an firewall blade in a chassis, with local policy "bestservice," where the local policy describes appropriate FW rules for "bestservice;" (b) $2^{nd}$ service is SN2: intrusion prevention system (IPS) running on a dedicated appliance having no direct named local policy; and (c) $3^{rd}$ service is SN3: deep packet inspection via an SCE appliance, with local policy "bestservice," and where the local policy defines SCE specific actions to be taken on "bestservice" traffic. This policy can be created on the service directory, or conveyed to the service directory from an external policy server. The service directory can in turn map this policy to an encoded service header, which can also be used for data plane communication.

Service chaining can then be propagated to appropriate participating elements or devices. For example, service classifiers can request a service via an ASCII namespace. This namespace may be mapped to a service chain on the service directory, and the service broker can return service information in the form of a header, next-hop/reachability, and encapsulation information to the service classifier. Using the above example, a service classifier requesting "bestservice" could receive: (a) service header=100; (b) next-hop 10.1.1.1; and (c) tunnel-type=GRE, where the service classifier prefers GRE tunnels. The service request can also include a service request type, a message length, and a service name requested.

Service nodes can receive from the service broker, service header, next-hop/reachability indications, and tunnel information, for example. If a service chain definition conveys dynamic policy as well, the policy information may be sent to service nodes for the service chains in which they participate. Based on the previous example, the following information may be conveyed to the service nodes:

SN1: vFW
   Service header: 100/Service: "bestservice"
     Next-service(s): IPS
     Next-hop(s): 10.2.2.2
     Tunnel-type: GRE
SN2:
   Service header: 100/Service: "bestservice"
     Next-service(s): SCE
     Next-hop(s): 10.3.3.3
     Tunnel-type: L2TPv3
SN3:
   Service header: 100/Service: "bestservice"
     Next-service(s): none
     Next-hop(s): none
     Tunnel-type: end of chain Service chains may be exchanged via a service chain exchange message using the control plane. In addition, both expected and unexpected failures can be managed using the control plane.

A service de-registration can have affects on service classifiers, where classifiers consuming a withdrawn service may need to be informed of that change. A service broker can send a withdraw message to the appropriate service classifiers (e.g., those sending packets to a de-registered service) to inform them of the service status change. Such a service withdraw message can include: (i) type: service withdraw; (ii) length: message length; (iii) number of services: number of services being withdrawn; (iv) service names withdrawn; and (v) service header: header of withdrawn services. Further, service classifier behavior after such service de-registration may be a policy decision, thus a selection of failing open or closed, or using a new service chain can be defined via the management and policy plane, for example.

In particular embodiments, the control plane can enable two "types" of resiliency: (i) control plane only: registration and de-registration of services; and (ii) control plane derived: "programming" the data plane. From a pure control plane perspective, failover and resiliency may be handled at both the transport and application layers. Should transport fail (e.g., the TCP session goes down), the control plane state machine can re-start, resulting in a re-registration of services from affected nodes. From an application perspective, periodic keepalive messages may convey service availability and service chains to various components. When a specified number of keepalives is not received, the services and associated service chains that have not been positively identified via a keepalive may be marked as failed.

Regardless of an underlying failure reason (e.g., transport or application), or other suitable change in service status, services associated with a given session may be removed from an available service table on the service broker, and a delete message can be sent from the service broker to the service nodes to remove the appropriate services from the available service table. In addition, the service broker may withdraw (e.g., via a header withdraw message) the service header and next-hop/reachability indications allocated to service classifiers that rely on a failed service.

In particular embodiments, load distribution can also be handled by both control and data planes. Control plane load distribution may be used in handling multiple instances of the same services. For example, if a service insertion architecture service domain contains two equal service nodes, both offering service X, a load distribution scheme may be used to spread the data plane traffic across both instances of service X. In addition, in some cases, service grooming might be required, where the control plane may shift traffic from one service node to another due to a variety of reasons, such as policy or changes in service load. In such a case, the control plane can ensure that the service nodes involved are functional, and then may inform the service classifier to change next-hop and service header information, for example.

In particular embodiments, traffic flow can be controlled by the allocation to a service classifier of service header and associated next-hop/reachability indications by the service broker. When a service classifier requests a service, the service broker can return the first hop or hops, or other reachability indications, into a service path. This service path can have a single ingress point, a unique first hop, or a series of ingress points, with equal or varying preference, for example. Further, load balancing variations can include round robin, parallel service, and metric adding, to name a few.

Although the description has been described with respect to particular embodiments thereof, these particular embodiments are merely illustrative, and not restrictive. For example, while particular service types and architecture arrangements have been shown, other services, features, systems, and/or arrangements could be used in accordance with particular embodiments.

An architecture in particular embodiments may be platform, operating system, and language independent. Therefore, any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising a service broker having:
one or more hardware processors; and
logic encoded in one or more non-transitory storage medium for execution by the one or more processors, and when executed operable to configure the service broker to:
register a service classifier to allow the service classifier to redirect an incoming packet for delivery of a service;
register a plurality of service nodes including receiving service capabilities and locations for each service node; and
provide context information from the service broker to the service classifier, wherein the context information comprises a service header, a reachability indication, and an encapsulation, the context information being used by the service classifier in redirecting the incoming packet to a first service node included in a service chaining order of service nodes for delivery of the service, wherein the service header provided by the service broker is inserted as a header in the redirected packet and provides information on (i) the service chaining order that includes an ordered list of service features to be performed on the redirected packet by the service nodes included in the service chaining order and (ii) classification information associated with avoiding duplicate classification or providing the classification information to a particular service node, and wherein the service header inserted in the redirected packet is alterable by any of the service nodes receiving the redirected packet to modify the service chaining order such as to alter a path taken by the redirected packet through the service chaining order,
wherein a service directory coupled to the service broker includes a policy that provides the service header that is provided to the service classifier to provide information on how the service features are to be applied to the incoming packet.

2. The apparatus of claim 1, wherein the service broker is further configured to receive capability and service requests from the service classifier.

3. The apparatus of claim 1, wherein the redirected packet is sent to a second service node from the first service node based on the modified service chaining order.

4. The apparatus of claim 1, wherein the service classifier is configured to redirect the incoming packet to the first service node by encapsulating the incoming packet with the inserted service header based on the encapsulation.

5. The apparatus of claim 1, wherein the service broker is configured to withdraw one of the service nodes by sending a withdraw message to the service classifier.

6. The apparatus of claim 1, wherein the policy includes the service chaining order and wherein the service header includes an encoded representation of the service chaining order.

7. The apparatus of claim 1, wherein the service broker is configured to receive service information from each of the service nodes in order to generate the context information.

8. A method, comprising:
registering a service classifier with a service broker to allow the service classifier to redirect an incoming packet for delivery of a service, wherein the service broker is a switching device having one or more processors thereon;
registering a plurality of service nodes with the service broker, wherein the registering includes receiving service capabilities and locations for each service node; and providing context information from the service broker to the service classifier, wherein the context information comprises a service header, a reachability indication, and an encapsulation, the context information being used by the service classifier in redirecting the incoming packet to a first service node included in a service chaining order of service nodes for delivery of the service, wherein the service header provided by the service broker is inserted as a header in the redirected packet and provides information on (i) the service chaining order that includes an ordered list of service features to be performed on the redirected packet by the service nodes included in the service chaining order and (ii) classification information associated with avoiding duplicate classification or providing the classification information to a particular service node, and wherein the service header inserted in the redirected packet is alterable by any of the service nodes receiving the redirected packet to modify the service chaining order such as to alter a path taken by the redirected packet through the service chaining order, wherein a service directory coupled to the service broker includes a policy that provides the service header that is provided to the service classifier to provide information on how the service features are to be applied to the incoming packet.

9. The method of claim 8, wherein registering the service classifier with the service broker comprises receiving service classifier capabilities and a request for services from the service classifier.

10. The method of claim 8, comprising:
classifying the incoming packet in response to predetermined rules in the service classifier;
inserting the service header from the context information to the incoming packet;
encapsulating the incoming packet with the inserted service header based on the encapsulation; and
redirecting the incoming packet to the first service node using the associated encapsulation and service header.

11. The method of claim 8, further comprising withdrawing one of the plurality of service nodes by sending a withdraw message to the service classifier.

12. The method of claim 8, wherein the registering the plurality of service nodes comprises receiving service information from each of the plurality of service nodes in the service broker in order to generate the context information.

* * * * *